(12) United States Patent
Tang

(10) Patent No.: US 9,305,232 B2
(45) Date of Patent: Apr. 5, 2016

(54) DISPLAY ORIENTATION CHANGE FOR WIRELESS DEVICES

(75) Inventor: Yu Tang, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1279 days.

(21) Appl. No.: 12/507,427

(22) Filed: Jul. 22, 2009

(65) Prior Publication Data

US 2011/0018904 A1  Jan. 27, 2011

(51) Int. Cl.
| G06K 9/00 | (2006.01) |
| G06K 9/32 | (2006.01) |
| G06F 1/16 | (2006.01) |
| G09G 3/20 | (2006.01) |

(52) U.S. Cl.
CPC ............ *G06K 9/3208* (2013.01); *G06F 1/1686* (2013.01); *G06F 1/1694* (2013.01); *G06K 9/00248* (2013.01); *G09G 3/20* (2013.01); *G06F 2200/1614* (2013.01); *G06F 2200/1637* (2013.01); *G09G 2340/0492* (2013.01)

(58) Field of Classification Search
USPC .......... 345/418, 650, 651, 658, 659, 656, 649
See application file for complete search history.

(56) References Cited

U.S. PATENT DOCUMENTS

| 5,900,909 A | 5/1999 | Parulski et al. |
| 2004/0201595 A1 | 10/2004 | Manchester |
| 2005/0104848 A1 | 5/2005 | Yamaguchi et al. |
| 2008/0239131 A1* | 10/2008 | Thorn ................. 348/333.01 |
| 2010/0066763 A1* | 3/2010 | MacDougall et al. ........ 345/656 |
| 2010/0208107 A1* | 8/2010 | Nonaka et al. ........... 348/240.99 |
| 2010/0328344 A1* | 12/2010 | Mattila et al. ................ 345/633 |
| 2011/0090256 A1* | 4/2011 | Manchester ................. 345/649 |
| 2011/0141141 A1* | 6/2011 | Kankainen ................... 345/632 |
| 2011/0298829 A1* | 12/2011 | Stafford et al. .............. 345/659 |
| 2012/0081392 A1* | 4/2012 | Arthur ......................... 345/633 |

FOREIGN PATENT DOCUMENTS

| EP | 2 065 783 | 6/2009 |
| WO | 2008075210 A1 | 6/2008 |

OTHER PUBLICATIONS

European Search Report dated Jan. 29, 2010, issued for European Patent Application No. EP 09166145.4.

* cited by examiner

*Primary Examiner* — Chante Harrison
(74) *Attorney, Agent, or Firm* — Ridout and Maybee LLP

(57) ABSTRACT

A method for controlling an orientation of a display of a wireless device using a combination of accelerometer-determined orientation and camera-determined orientation, the camera being a frontal camera used to confirm or reverse the orientation found by the accelerometer.

22 Claims, 5 Drawing Sheets

DISPLAY ORIENTATION CHANGE FOR WIRELESS DEVICES

CROSS REFERENCE TO RELATED APPLICATIONS

This is the first application filed for the present invention.

FIELD

This application relates to the field of display orientations for wireless devices, and more specifically, to detection and confirmation of an appropriate orientation for the display.

BACKGROUND

Current wireless mobile communication devices include microprocessors, memory, soundcards, and run one or more software applications. Examples of software applications used in these wireless devices include micro-browsers, address books, email clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

Wireless devices communicate with each other and over wireless networks. Typically, wireless networks are maintained by wireless carriers. A wireless carrier or wireless network operator typically owns and operates a wireless network including radio equipment, base stations, antennae, interface equipment, servers, associated landlines, etc. A carrier also manages basic billing and other back-end services needed to sell wireless services to subscribers. Each wireless network can be based one of several different wireless standards or technologies including Code-Division Multiple Access ("CDMA"), General Packet Radio Service ("GPRS"), Mobitex, and Motorola's Integrated Digital Enhanced Network ("iDEN") and DataTAC™ networks.

Currently, wireless devices rely on accelerometers, which are gravity sensitive, to detect orientation, which they use to change the display orientation from portrait to landscape and vice versa. However, since the accelerometers are gravity sensitive, when a person is not standing straight, for example if they are lying on a bed, the display orientation could be changed incorrectly.

A need therefore exists for an improved method and system for wireless devices to detect an orientation of the display. Accordingly, a solution that addresses, at least in part, the above and other shortcomings is desired.

BRIEF DESCRIPTION OF THE DRAWINGS

It will be noted that throughout the appended drawings, like features are identified by like reference numerals.

DETAILED DESCRIPTION

Figure 1:
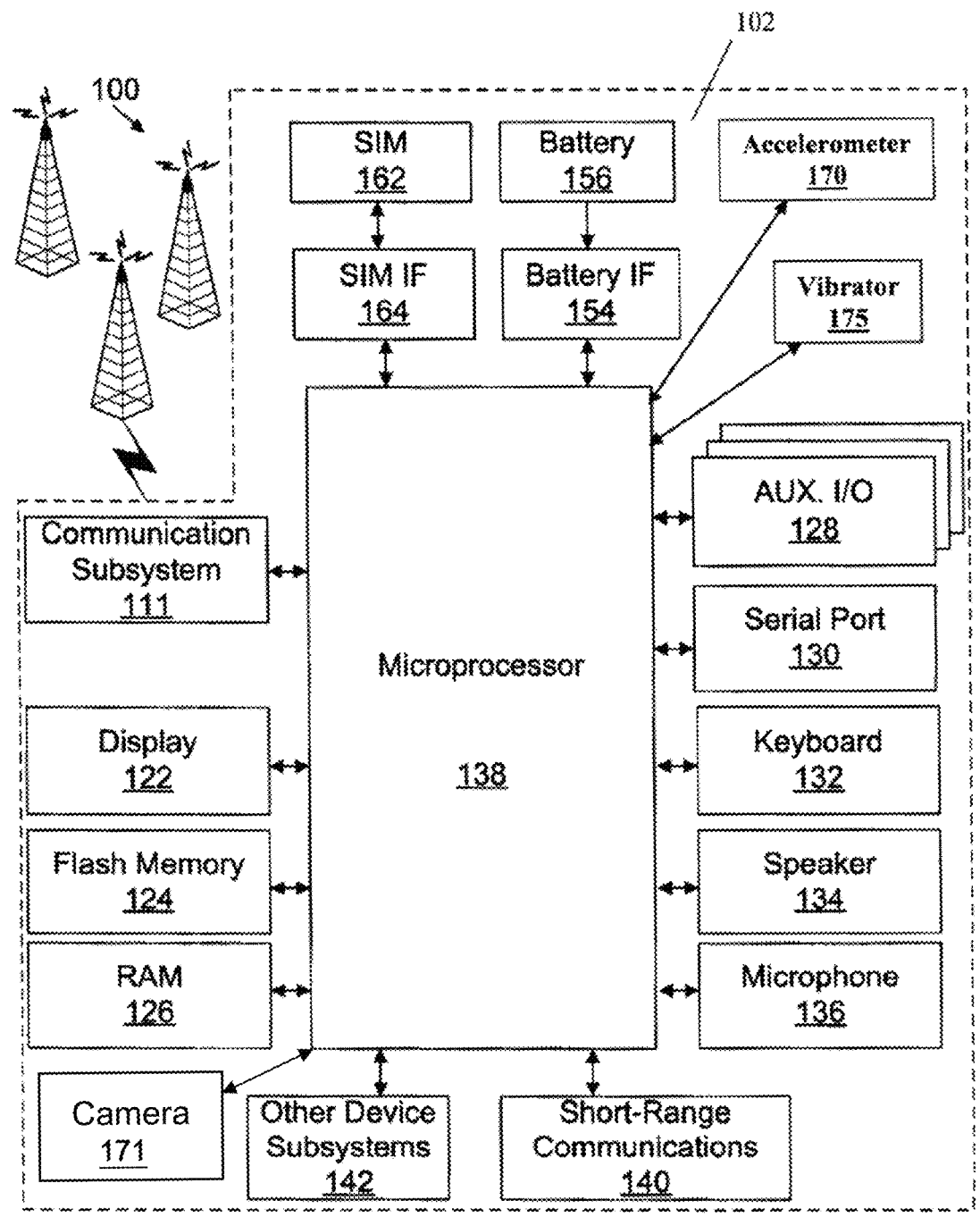
FIG. 1 is a block diagram illustrating a wireless device adapted in accordance with an example embodiment of the application.

The following detailed description of the example embodiments of the present application does not limit the implementation of the application to any particular computer programming language. The present application may be implemented in any computer programming language provided that the operating system ("OS") provides the facilities that may support the requirements of the present application. An example embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present application.

In some aspects, there is provided a computer-implemented method for controlling an orientation of a display on a wireless device comprising: receiving at least one acceleration measurement from at least one accelerometer in the wireless device; using the at least one acceleration measurement to determine a first orientation of the wireless device; acquiring at least one image from a frontal camera of the wireless device; using the at least one image to determine a second orientation of the wireless device; comparing the first orientation and the second orientation: when the first orientation and the second orientation do not match, selecting a display orientation corresponding to a default orientation, the default orientation corresponding to a predetermined one of the first orientation and the second orientation; when the first orientation and the second orientation match, selecting either one as the display orientation; and providing the display on the wireless device in accordance with the display orientation.

In some aspects, there is provided a wireless device comprising: a processor coupled to a memory, a display screen, at least one accelerometer, and a frontal camera and adapted for: controlling an orientation of the display screen of the wireless device by: receiving at least one acceleration measurement from at least one accelerometer in the wireless device; using the at least one acceleration measurement to determine a first orientation of the wireless device; acquiring at least one image from a frontal camera of the wireless device; using the at least one image to determine a second orientation of the wireless device; comparing the first orientation and the second orientation: when the first orientation and the second orientation do not match, selecting a display orientation corresponding to a default orientation, the default orientation corresponding to a predetermined one of the first orientation and the second orientation; when the first orientation and the second orientation match, selecting either one as the display orientation; and providing the display on the wireless device in accordance with the display orientation.

In some aspects, there is provided a module for controlling an orientation of a display of a wireless device, the module embodied on a computer readable medium and configured for: receiving at least one acceleration measurement from at least one accelerometer in the wireless device; using the at least one acceleration measurement to determine a first orientation of the wireless device; acquiring at least one image from a frontal camera of the wireless device; using the at least one image to determine a second orientation of the wireless device; comparing the first orientation and the second orientation: when the first orientation and the second orientation do not match, selecting a display orientation corresponding to a default orientation, the default orientation corresponding to a predetermined one of the first orientation and the second orientation; when the first orientation and the second orientation match, selecting either one as the display orientation; and providing the display on the wireless device in accordance with the display orientation.

For the purpose of the present description, a "wireless device" will be understood to be a generic and all-encompassing term used to describe communications in which electromagnetic waves or RF (rather than some form of wire) carry a signal over part or the entire communication path. Common examples of wireless equipment in use today include: Professional LMR (Land Mobile Radio) and SMR (Specialized Mobile Radio), Consumer Two Way Radio including FRS (Family Radio Service), GMRS (General Mobile Radio Service) and Citizens band ("CB") radios, the Amateur Radio Service (Ham radio), Consumer and professional Marine VHF radios, Cellular telephones and pagers, Global Positioning System (GPS), Cordless computer peripherals, Cordless telephone sets, and wireless gaming. Wireless communication can be via radio frequency communication, microwave communication, for example long-range line-of-sight via highly directional antennas, or short-range communication, or infrared (IR) short-range communication, for example from remote controls or via IRDA.

FIG. 1 is a block diagram illustrating a wireless device 102 and wireless network 100 adapted in accordance with an example embodiment of the application. Typically, the wireless device 102 is a handheld device 102. The wireless network 100 includes antenna, base stations, and supporting radio equipment, known to those of ordinary skill in the art, for supporting wireless communications between the wireless device 102 and other wireless devices and systems (not shown). The wireless network 100 may be coupled to a wireless network gateway (not shown) and to a wide area network (not shown) to which the other systems (not shown) may be coupled through appropriate interfaces (not shown).

The wireless device 102 is a two-way communication device having at least voice and advanced data communication capabilities, including the capability to communicate with other computer systems. Depending on the functionality provided by the device 102, it may be referred to as a data messaging device, a two-way pager, a cellular telephone with data messaging capabilities, a wireless Internet appliance, or a data communication device (with or without telephony capabilities). The device 102 may communicate with any one of a plurality of fixed transceiver stations 100 within its geographic coverage area.

The wireless device 102 will normally incorporate a communication subsystem 111, which includes a RF receiver, a RF transmitter, and associated components, such as one or more (preferably embedded or internal) antenna elements and local oscillators ("LOs"), and a processing module such as a digital signal processor ("DSP") (all not shown). As will be apparent to those skilled in field of communications, particular design of the communication subsystem 111 depends on the communication network 100 in which the device 102 is intended to operate.

Network access is associated with a subscriber or user of the device 102 and therefore the device 102 requires a Subscriber Identity Module (or "SIM" card) 162 to be inserted in a SIM interface ("IF") 164 in order to operate in the network. The device 102 is a battery-powered device so it also includes a battery IF 154 for receiving one or more rechargeable batteries 156. Such a battery 156 provides electrical power to most if not all electrical circuitry in the device 102, and the battery IF 154 provides for a mechanical and electrical connection for it. The battery IF 154 is coupled to a regulator (not shown) which provides power to the circuitry of the device 102.

The wireless device 102 includes a microprocessor (or central processing system ("CPU")) 138 which controls overall operation of the device 102. Communication functions, including at least data and voice communications, are performed through the communication subsystem 111. The microprocessor 138 also interacts with additional device subsystems such as a display 122, a flash memory 124 or other persistent store, a random access memory ("RAM") 126, 30 auxiliary input/output ("I/O") subsystems 128, a serial port 130, a keyboard 132, a speaker 134, a microphone 136, a short-range communications subsystem 140, and any other device subsystems generally designated at 142. Some of the subsystems shown in FIG. 2 perform communication-related functions, whereas other subsystems may provide "resident" or on-device functions. Notably, some subsystems, such as the keyboard 132 and display 122, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, enables execution of software applications on the device 102. A predetermined set of applications which control basic device operations, including at least data and voice communication applications, will normally be installed on the device 102 during its manufacture. An application that may be loaded onto the device 102 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 102 and SIM 162 to facilitate storage of PIM data items and other information.

The PIM application may have the ability to send and receive data items via the wireless network 100. In an example embodiment, PIM data items are seamlessly integrated, synchronized, and updated via the wireless network 100, with the user's corresponding data items stored and/or associated with a host computer system (not shown) thereby creating a mirrored host computer on the device 102 with respect to such items. This is especially advantageous where the host computer system is the user's office computer system (not shown). Additional applications may also be loaded onto the device 102 through the network 100, an auxiliary I/O subsystem 128, serial port 130, short-range communications subsystem 140, or any other suitable subsystem 142, and installed by a user in RAM 126 or in a non-volatile store (not shown) for execution by the microprocessor 138. Such flexibility in application installation increases the functionality of the device 102 and may provide enhanced on-device functions, communication-related functions, or both. For example, secure communication applications may enable electronic commerce functions and other such financial transactions to be performed using the wireless device 102.

In a data communication mode, a received signal such as a text message, an email message, or web page download will be processed by the communication subsystem 111 and input to the microprocessor 138. The microprocessor 138 will further process the signal for output to the display 122 and/or to the auxiliary I/O device 128. A user of the wireless device 102 may also compose data items, such as email messages, for example, using the keyboard 132 in conjunction with the display 122 and possibly the auxiliary I/O device 128. The keyboard 132 may be a complete alphanumeric keyboard and/or telephone-type keypad. These composed items may be transmitted over a communication network 100 through the communication subsystem 111 or the short range communication subsystem 140.

For voice communications, the overall operation of the wireless device 102 is substantially similar, except that the received signals would be output to the speaker 134 and signals for transmission would be generated by the microphone 136. Alternative voice or audio I/O subsystems, such as a voice message recording subsystem, may also be implemented on the device 102. Although voice or audio signal output is may be accomplished primarily through the speaker 134, the display 122 may also be used to provide, for example, an indication of the identity of a calling party, duration of a voice call, or other voice call related information.

Figure 2:
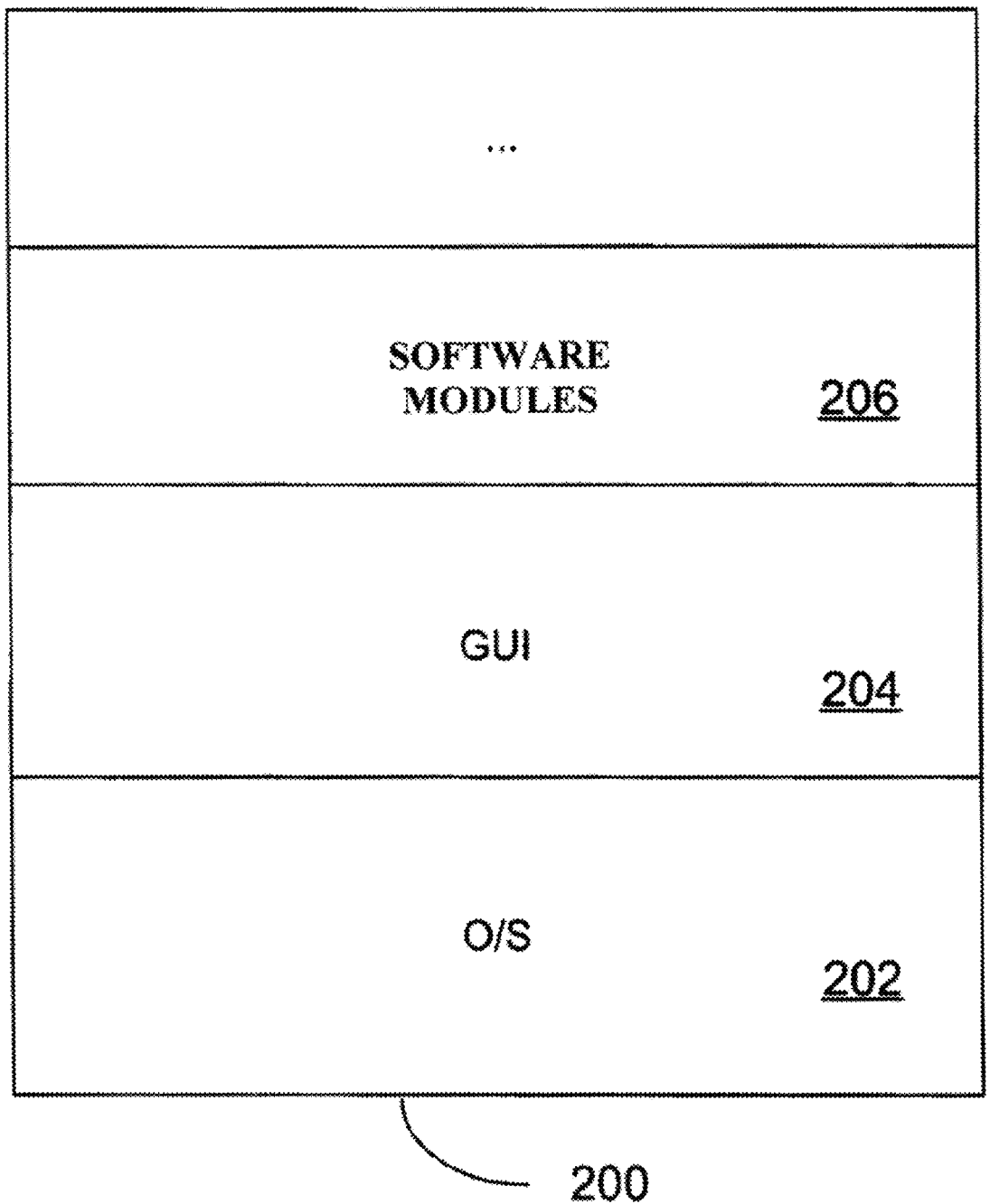
FIG. 2 is a block diagram illustrating a memory of the wireless device of FIG. 1 in accordance with an example embodiment of the application.

The serial port 130 shown in FIG. 2 is normally implemented in a personal digital assistant ("PDA")-type communication device for which synchronization with a user's desktop computer is a desirable, albeit optional, component. The serial port 130 enables a user to set preferences through an external device or software application and extends the capabilities of the device 102 by providing for information or software downloads to the device 102 other than through a wireless communication network 100. The alternate download path may, for example, be used to load an encryption key onto the device 102 through a direct and thus reliable and trusted connection to thereby provide secure device communication.

The short-range communications subsystem 140 shown in FIG. 1 is an additional optional component which provides for communication between the device 102 and different systems or devices (not shown), which need not necessarily be similar devices. For example, the subsystem 140 may include an infrared device and associated circuits and components, or a Bluetooth™ communication module to provide for communication with similarly-enabled systems and devices. Bluetooth™ is a registered trademark of Bluetooth SIG, Inc.

The SIM card 162 is a small, stamp-sized "smart card" that is used in a Global System for Mobile Communications ("GSM") wireless device 102. Typically, the SIM contains a microchip that stores data that identifies the wireless device 102 to a carrier or service provider. The SIM also stores data used to encrypt voice and data transmissions, phone book information, etc. Typically, the SIM can be removed from a first wireless device and placed in a second wireless device. This enables the second wireless device to use information such as the subscriber's telephone and account numbers. The interface between a SIM and the wireless device 102 within a wireless network 100 is defined in European Telecommunications Standards Institute ("ETSI") standard GSM 11.11 Version 6.2.0 Release 1997 ("Digital Cellular Telecommunications System (Phase 2+); Specification of the Subscriber Identity Module—Mobile Equipment (SIM—ME) Interface"), which is incorporated herein by reference. A carrier can be uniquely identified through the Mobile Country Code ("MCC") and Mobile Network Code ("MNC") assigned to the subscriber and stored in the International Mobile Subscriber Identity ("IMSI") file in the SIM of the subscriber's wireless device 102. The wireless network 100 can include Code-Division Multiple Access ("CDMA"), General Packet Radio Service ("GPRS"), Mobitex, and Motorola's Integrated Digital Enhanced Network ("iDEN") and DataTAC™ networks.

FIG. 2 is a block diagram illustrating a memory 200 of the wireless device 102 of FIG. 1 in accordance with an example embodiment of the application. The memory 200 has various software components for controlling the device 102 and may include flash memory 124, RAM 126, or ROM (not shown), for example. In accordance with an example embodiment of the application, the wireless device 102 is intended to be a multi-tasking wireless communications device configured for sending and receiving data items and for making and receiving voice calls. To provide a user-friendly environment to control the operation of the device 102, an operating system ("OS") 202 resident on the device 102 provides a basic set of operations for supporting various applications typically operable through a graphical user interface ("GUI") 204. For example, the OS 202 provides basic input/output system features to obtain input from the auxiliary I/O 128, keyboard 132, and the like, and for facilitating output to the user. In accordance with an example embodiment of the application, there are provided software modules 206 for determining whether the wireless device is being held in a user's hand as will be described below. Though not shown, one or more applications for managing communications or for providing personal digital assistant like functions may also be included.

Thus, the wireless device 102 includes computer executable programmed instructions for directing the device 102 to implement example embodiments of the present application. The programmed instructions may be embodied in one or more software modules 206 resident in the memory 200 of the wireless device 102. Alternatively, the programmed instructions may be embodied on a computer readable medium (such as a CD disk or floppy disk) which may be used for transporting the programmed instructions to the memory 200 of the wireless device 102. Alternatively, the programmed instructions may be embedded in a computer-readable, signal-bearing medium that is uploaded to a network by a vendor or supplier of the programmed instructions, and this signal-bearing medium may be downloaded through an interface 111, 130, 140 to the wireless device 102 from the network by end users or potential buyers.

Figure 3:
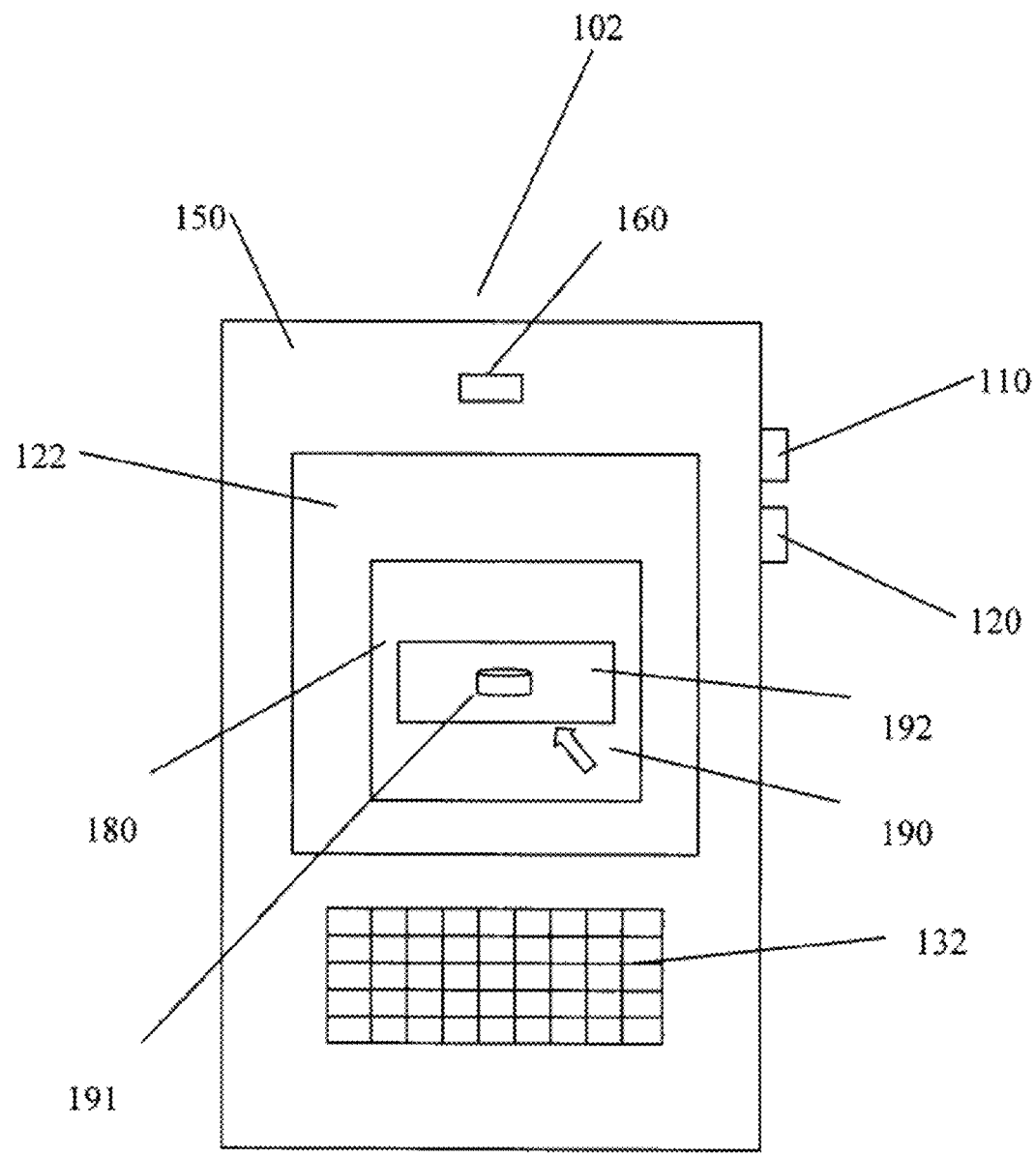
FIG. 3 is a front view illustrating the wireless device of FIG. 1 in accordance with an example embodiment of the application.

FIG. 3 is a front view illustrating the wireless device 102 of FIG. 1 in accordance with an example embodiment of the application. As mentioned above, the wireless device 102 can be a data and voice-enabled handheld device. The wireless device 102 includes a casing 150, a display screen 122, a graphical user interface ("GUI") 180, a keyboard (or keypad) 132, a thumbwheel (or other input device such as a trackwheel, trackball or joystick) 110, various select buttons 120, and various signal inputs/outputs 160 (e.g., power connector input, microphone, speaker, data interface input, etc.). Internally, the wireless device 102 includes one or more circuit boards, a CPU 138, memory 200, a battery 156, an antenna, etc. (not shown) which are coupled to the signal inputs/outputs 160, keyboard 132, display screen 122, etc.

The microprocessor 138 of the wireless device 102 is typically coupled to one or more devices 110, 120, 132 for receiving user commands or queries and for displaying the results of these commands or queries to the user on the display 122. For example, user queries may be transformed into a combination of SQL commands for producing one or more tables of output data which may be incorporated in one or more display pages for presentation to the user. The microprocessor 138 is coupled to memory 200 for containing software modules 206 and data such as base tables or virtual tables such as views or derived tables. As mentioned, the memory 200 may include a variety of storage devices typically arranged in a hierarchy of storage as understood to those skilled in the art.

A user may interact with the wireless device 102 and its software modules 206 using the graphical user interface ("GUI") 180. GUIs are supported by common operating systems and provide a display format which enables a user to choose commands, execute application programs, manage computer files, and perform other functions by selecting pictorial representations known as icons, or items from a menu through use of an input or pointing device such as a thumbwheel 110 and keyboard 132. In general, a GUI is used to convey information to and receive commands from users and generally includes a variety of GUI objects or controls, including icons, toolbars, drop-down menus, pop-up menus, text, dialog boxes, buttons, and the like. A user typically interacts with a GUI 180 presented on a display 122 by using an input or pointing device (e.g., a thumbwheel) 110 to position a pointer or cursor 190 over an object 191 (i.e., "pointing" at the object) and by "clicking" on the object 191. (e.g., by depressing the thumbwheel 110 or other button). This is often referred to as a point-and-click operation or a selection operation. Typically, the object 191 may be highlighted (e.g., shaded) when it is pointed at.

Typically, a GUI based system presents application, system status, and other information to the user in "windows" appearing on the display 122. A window 192 is a more or less rectangular area within the display 122 in which a user may view an application or a document. Such a window 192 may be open, closed, displayed full screen, reduced to an icon, increased or reduced in size, or moved to different areas of the display 122. Multiple windows may be displayed simultaneously, such as: windows included within other windows, windows overlapping other windows, or windows tiled within the display area.

The present application provides a method and system for determining the orientation of a display of a wireless device 102. Referring again to FIG. 1, in accordance with the present application, the wireless device 102 includes an accelerometer 170 and a vibration motor or vibrator 175. The wireless device 170 also includes a camera 171. Each of the accelerometer 170 and camera 171 are coupled to the microprocessor 138 either directly or through intermediary I/O circuitry 128. Each of the accelerometer 170 and camera 171 may include respective local controllers or drivers (not shown). Under the control of software modules 206, the microprocessor 138 sends ON/OFF 25 control messages to the camera 171 and reads output messages from the accelerometer 170.

The accelerometer 170 may be a based on piezoelectric, piezioresistive, micromechanical capacitive, or microelectrical mechanical systems ("MEMS") technology. A MEMS accelerometer may be mounted on a circuit board within the wireless device 102. MEMS accelerometers may be based on bulk micromachined, surface micromachined, and thermal bulk/micromachined technology. For example, a thermal-based MEMS accelerometer has no moving parts. Its principle of operation is based on differential thermal sensing of a heated gas inside a hermetic component. With no moving parts, such an accelerometer is capable of surviving the high shocks typically experienced by wireless devices, both in the field and during production. Typically, a single MEMS accelerometer can measure accelerations along two orthogonal axes. Thus, two MEMS accelerometers positioned orthogonal to each other can provide complete three axis motion information. While accelerometers output acceleration measurements and not position measurements, if position measurements are required these can be calculated by double integration of the acceleration measurements.

The camera 171 is a frontal camera present on the front of the wireless device 102 and it may be capable of capturing images in the form of still photographs or motion video. It may be located anywhere on the front surface of the camera, above or below the display screen 122, centrally or not. In an example embodiment, the camera 171 is provided centrally above the display screen 122 to facilitate the image acquisition process of a face. The applicable cameras for the present application are not limited to any type of manufacturer and may have varying degrees of resolution. Increased resolution will facilitate the face detection algorithm. Any camera already present on a wireless device 102 may be used with the presently described method by providing a software addition to the device.

By combining an on-board accelerometer 170 with an on-board camera 171, wireless devices 102 are given the means required to detect the proper orientation of the display for the wireless device 102. If a user is holding a wireless device 102 while laying on a bed, the combination of software and hardware will work together to determine the proper orientation of the display of the wireless device 102.

In particular, the acceleration patterns are measured by the accelerometer 170 in the wireless device 102. The microprocessor 138 of the wireless device 102 reads the output of the accelerometer 170 over the predetermined time period to determine a first orientation of the wireless device. At least one image is also acquired from the camera 171. The microprocessor 138 uses the at least one image to determine a second orientation of the wireless device.

For example, if the wireless device 102 was held while the user was laying on a bed, the accelerometer 170 would measure a first acceleration pattern which the wireless device 102 could store in its memory 200. The first orientation would be found to be landscape. The camera 171 would acquire at least one image, either through motion video or still photographs, and determine a second orientation. This second orientation would be portrait. By comparing the first and second orientations, the wireless device 102 can determine the appropriate orientation.

In one example embodiment, the images acquired by the camera are used to confirm or reverse the orientation determined using the accelerometer. In this example, the camera-determined orientation is set as the default orientation. If a comparison shows a discrepancy between the camera-determined orientation and the accelerometer-determined orientation, the camera-determined orientation is selected, as it is the default one. Alternatively, the accelerometer may be used to confirm or reverse the camera-determined orientation. When the two orientations match, either one may be selected as the display orientation.

In one example embodiment, a face detection algorithm is used for the camera-determined orientation. Face detection can be regarded as a specific case of object-class detection. In object-class detection, the task is to find the locations and sizes of all objects in an image that belong to a given class. Examples include upper torsos, pedestrians, and cars. Face detection applies more specifically to faces. Many algorithms implement the face-detection task as a binary pattern-classification task. That is, the content of a given part of an image is transformed into features, after which a classifier trained on example faces decides whether that particular region of the image is a face, or not. Often, a window-sliding technique is employed. That is, the above mentioned classifier is used to classify the usually square or rectangular portions of an image, at all locations and scales, as either faces or non-faces. Non-faces are usually qualified as background patterns.

Part of a facial recognition algorithm can be used to determine orientation, as these algorithms identify faces by extracting landmarks, or features, from an image of the subject's face. For example, an algorithm may analyze the relative position, size, and/or shape of the eyes, nose, cheekbones, and jaw. Orientation can then be determined by locating these features relative to one another. Any known face detection and/or facial recognition algorithm may be used.

In an example embodiment, the camera 171 takes photographic images or a video stream as input. The output may consist of an array of rectangles which correspond to the location and scale of faces detected. If it detects no faces, it will return an empty array. In a first step, the microprocessor 138 uses an adaptive pre-filter to eliminate candidate rectangles in the input that it can confidently determine do not contain faces. In a second step, the microprocessor 138 feeds the remaining rectangles to a framework for rapid object detection. In a third step false positives are eliminated. A color filter and an edge filter are applied to improve the precision of the detection. A support vector machine (SVM) filter may be used, plus lighting correction and histogram equalization, to further eliminate false positives. Each rectangle is then output, which contains a detected face, along with its confidence in each detection. From the detected face, step four consists in locating various features on the face and their relative position in order to determine orientation of the face.

In one example embodiment, no face is detected in the acquired image. In this case, a second orientation is not found and the default orientation is set to the accelerometer-determined orientation. In another embodiment, the display orientation may be anywhere within a 360° range and is not bound to the traditional portrait/landscape orientation. In addition, the frontal camera may be activated permanently, or it may only be activated when an acceleration measurement is received.

Figure 4:
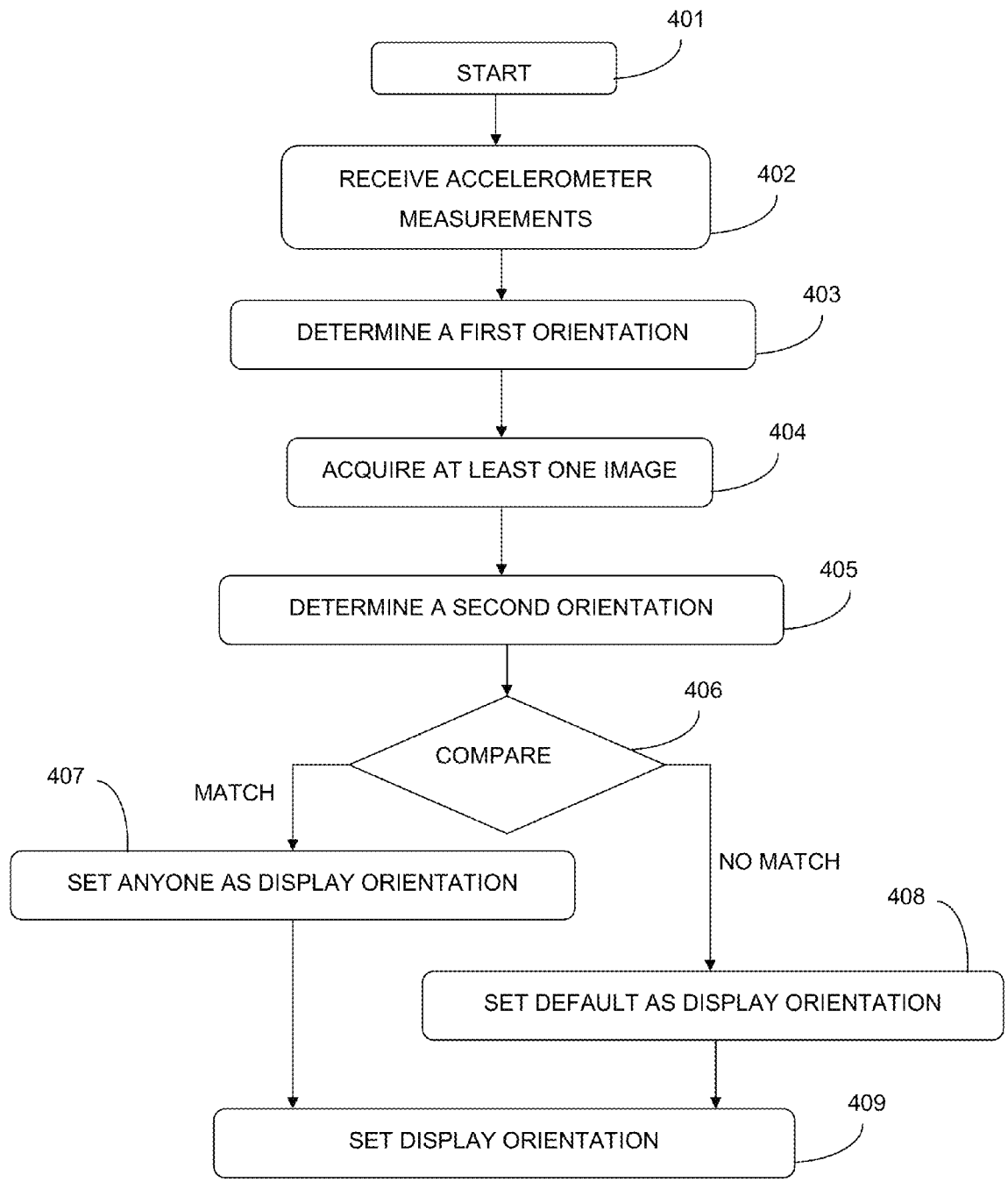
FIG. 4 is a flow chart illustrating operations of modules within a wireless device for determining the orientation of the wireless device in accordance with an example embodiment of the application.

The above described method may be summarized with the aid of a flowchart. FIG. 4 is a flow chart illustrating operations of modules 206 within a wireless device 102 for determining the orientation of the display of the wireless device 102 in accordance with an example embodiment of the application.

At step 401, the operations start. At step 402, at least one acceleration measurement is received from at least one accelerometer in the wireless device. At step 403, a first orientation is determined using the at least one acceleration measurement. At step 404, at least one image is acquired from a frontal camera of the wireless device. At step 405, a second orientation of the wireless device is determined using the at least one image.

Step 406 is where a comparison occurs between the first orientation and the second orientation previously determined. If there is a match, either one of the two orientations can be set as the display orientation 407. If there is no match, whichever orientation has been predetermined to be the default orientation becomes the display orientation 408. The display on the wireless device is then set in accordance with the display orientation 409.

Figure 5:
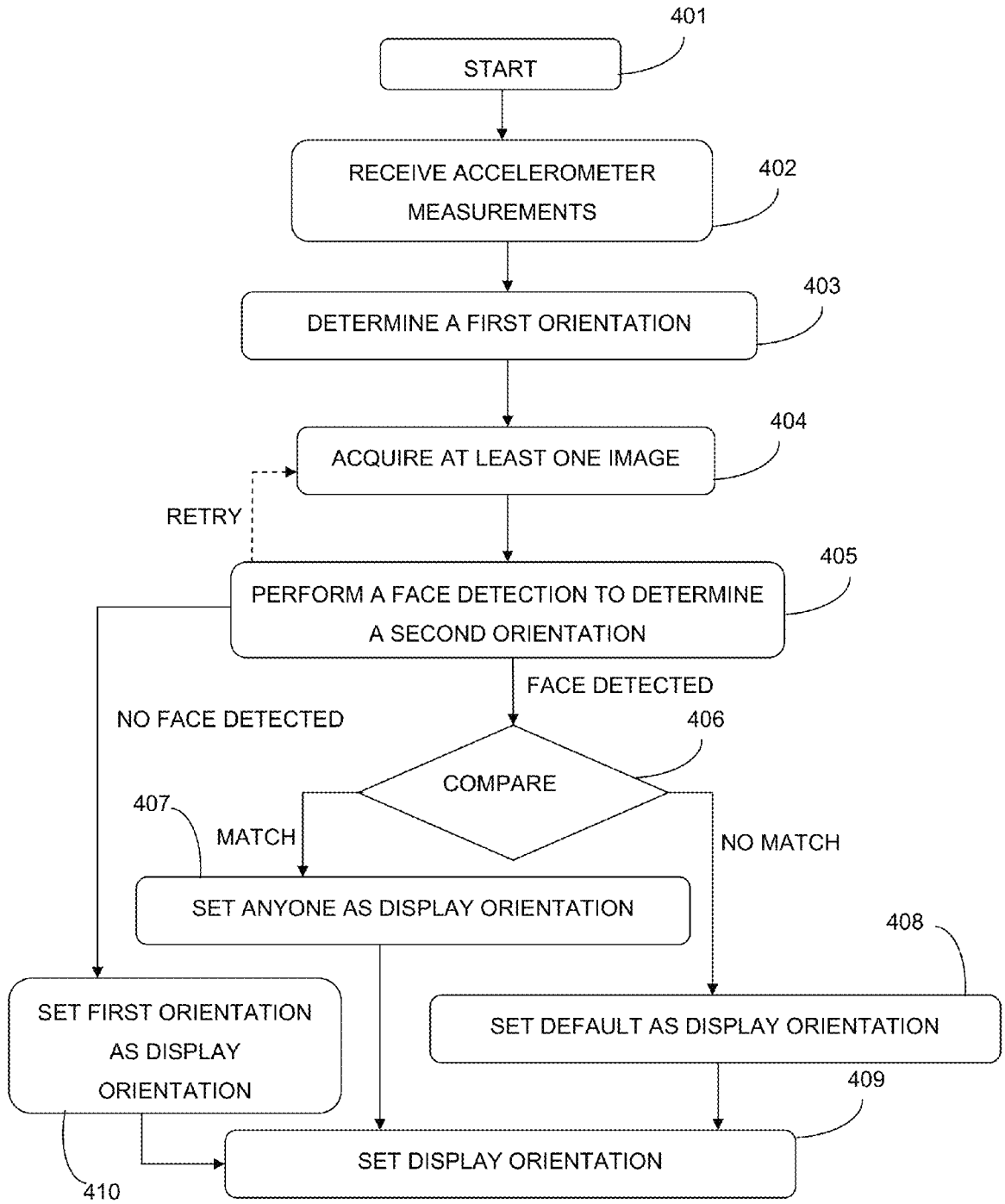
FIG. 5 is a flow chart illustrating operations of modules within a wireless device for determining the orientation of the wireless device when face recognition is performed, in accordance with an example embodiment of the application.

Reference is now made to FIG. 5, which illustrates an example embodiment of the method of FIG. 4 when face detection is used. At step 401, the operations start. At step 402, at least one acceleration measurement is received from at least one accelerometer in the wireless device. At step 403, a first orientation is determined using the at least one acceleration measurement. At step 404, at least one image is acquired from a frontal camera of the wireless device. Step 405 illustrates performing a face detection operation to determine a second orientation. If a face is detected, the method moves on to step 406 as per the flowchart of FIG. 4. If no face is detected, the first orientation is set as the display orientation 410 and the display orientation is then set accordingly 409. In an example embodiment, in the case of no face detected, the algorithm may be set to retry the acquisition of an image 404 a predetermined number of times or for a predetermined time limit. For example, the system may be configured to try three times to acquire an image and if after the third time there is still no face detected, then the method moves on to step 410. If during one of the retries a face is detected, then the method moves on to step 406. In another example, the system is configured to try acquiring an image for 30 ms and if after this time there is still no face detected, then the method moves on to step 410. If during one of the retries within the 30 ms a face is detected, then the method moves on to step 406. The number of retries and/or the time limit set for retries may vary and the examples of 3 and 30 ms, respectively, are meant to be illustrative and not limiting.

While the blocks of the method in FIGS. 4 and 5 are shown as occurring in a particular order, it will be appreciated by those skilled in the art that many of the blocks are interchangeable and may occur in different orders than that shown without materially affecting the end results of the methods. Additionally, while the present disclosure relates to code or functions that reside on a wireless device 102, this is not meant to limit the scope of possible applications of the described methods and module. Any system that utilizes static code on any type of computer readable medium, could be utilized without causing departure from the spirit and scope of the present disclosure.

While the present disclosure is primarily described as a method, a person of ordinary skill in the art will understand that the present disclosure is also directed to an apparatus for carrying out the disclosed method and including apparatus parts for performing each described method block, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular example embodiments without departing from the intended scope of the present disclosure. In particular, selected features from one or more of the above-described example embodiments may be combined to create alternative example embodiments not explicitly described, features suitable for such combinations being readily apparent to persons skilled in the art. The subject matter described herein in the recited claims intends to cover and embrace all suitable changes in technology.

What is claimed is:

1. A computer-implemented method for controlling an orientation of a display on a wireless device comprising:
   using at least one acceleration measurement to determine a first orientation of the wireless device;
   using at least one image to determine a second orientation of the wireless device;
   detecting if there is a face in the at least one image and if no face is detected, selecting the first orientation as a display orientation;
   if the face is detected and the first and second orientations do not match, selecting the second orientation as the display orientation;
   if the face is detected and the first and second orientations match, selecting either one as the display orientation; and
   providing the display as a whole on the wireless device in accordance with the display orientation.

2. The method of claim 1, further comprising activating a frontal camera when the at least one acceleration measurement is received.

3. The method of claim 1, wherein the using at least one image comprises using multiple images from an input video stream.

4. The method of claim 1, wherein the display orientation is one of portrait and landscape.

5. The method of claim 1, wherein the at least one acceleration measurement is an acceleration pattern.

6. The method of claim 1, wherein the using at least one acceleration measurement from an accelerometer in the wireless device is performed during a predetermined period.

7. The method of claim 1, further comprising receiving the at least one acceleration measurement from at least one accelerometer in the wireless device.

8. The method of claim 1, further comprising acquiring the at least one image from a frontal camera of the wireless device.

9. The method of claim 1, wherein a default orientation corresponds to a predetermined one of the first orientation and the second orientation, and the default orientation is used when the first orientation and the second orientation match.

10. A wireless device comprising:
    a processor coupled to a memory, a display screen, at least one accelerometer, and a frontal camera and adapted for:
    using at least one acceleration measurement to determine a first orientation of the wireless device;
    using at least one image to determine a second orientation of the wireless device;
    detecting if there is a face in the at least one image and if no face is detected, selecting the first orientation as a display orientation;
    if the face is detected and the first and second orientations do not match, selecting the second orientation as the display orientation;
    if the face is detected and the first and second orientations match, selecting either one as the display orientation; and
    providing the display as a whole on the wireless device in accordance with the display orientation.

11. The wireless device of claim 10, further comprising activating the frontal camera when the at least one acceleration measurement is received.

12. The wireless device of claim 10, wherein the using at least one image comprises using multiple images from an input video stream.

13. The wireless device of claim 10, wherein the display orientation is one of portrait and landscape.

14. The wireless device of claim 10, wherein the at least one acceleration measurement is an acceleration pattern.

15. The wireless device of claim 10, wherein the using at least one acceleration measurement from the accelerometer in the wireless device is performed during a predetermined period.

16. The wireless device of claim 10, further comprising receiving the at least one acceleration measurement from at least one accelerometer in the wireless device.

17. The wireless device of claim 10, further comprising acquiring the at least one image from the frontal camera of the wireless device.

18. The wireless device of claim 10, wherein a default orientation corresponds to a predetermined one of the first orientation and the second orientation, and the default orientation is used when the first orientation and the second orientation match.

19. A non-transitory computer readable medium including program instructions recorded thereon for controlling an orientation of a display of a wireless device, the program instructions when executed configuring a processor of the wireless device for:
    using at least one acceleration measurement to determine a first orientation of the wireless device;
    using at least one image to determine a second orientation of the wireless device;
    detecting if there is a face in the at least one image and if no face is detected, selecting the first orientation as a display orientation;
    if the face is detected and the first and second orientations do not match, selecting the second orientation as the display orientation;
    if the face is detected and the first and second orientations match, selecting either one as the display orientation; and
    providing the display as a whole on the wireless device in accordance with the display orientation.

20. The non-transitory computer readable medium of claim 19, further comprising receiving the least one acceleration measurement from at least one accelerometer in the wireless device.

21. The non-transitory computer readable medium of claim 19, further comprising acquiring the at least one image from a frontal camera of the wireless device.

22. The non-transitory computer readable medium of claim 19, wherein a default orientation corresponds to a predetermined one of the first orientation and the second orientation, and the default orientation is used when the first orientation and the second orientation match.

* * * * *